United States Patent
Abiko et al.

(10) Patent No.: US 7,362,955 B2
(45) Date of Patent: Apr. 22, 2008

(54) VIDEO RECORDING AND REPRODUCING APPARATUS

(75) Inventors: Yukihiro Abiko, Kawasaki (JP); Yoshiyuki Okada, Kawasaki (JP); Hideo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 985 days.

(21) Appl. No.: 09/816,370

(22) Filed: Mar. 26, 2001

(65) Prior Publication Data

US 2002/0041752 A1    Apr. 11, 2002

(30) Foreign Application Priority Data

Oct. 6, 2000    (JP)    ............................. 2000-308159

(51) Int. Cl.
*H04N 5/91* (2006.01)

(52) U.S. Cl. ..................................... 386/96; 386/125

(58) Field of Classification Search ................. 386/46, 386/83, 95, 92, 68, 125, 126, 111
See application file for complete search history.

(56) References Cited

U.S. PATENT DOCUMENTS

| | | | | |
|---|---|---|---|---|
| 5,485,611 A | * | 1/1996 | Astle | ............................. 707/1 |
| 5,546,191 A | * | 8/1996 | Hibi et al. | ..................... 386/83 |
| 5,592,450 A | * | 1/1997 | Yonemitsu et al. | ........... 386/96 |
| 5,630,006 A | * | 5/1997 | Hirayama et al. | ............ 386/92 |
| 5,666,555 A | * | 9/1997 | Okazaki et al. | .......... 715/500.1 |
| 5,867,229 A | * | 2/1999 | Stevens | ...................... 348/722 |
| 5,926,603 A | * | 7/1999 | Tanaka et al. | ................. 386/53 |
| 6,275,451 B1 | * | 8/2001 | Park et al. | ................... 386/106 |
| 6,311,013 B1 | * | 10/2001 | Shimizu et al. | ............. 386/111 |
| 6,377,745 B2 | * | 4/2002 | Akiba et al. | .................. 386/68 |
| 6,542,695 B1 | * | 4/2003 | Akiba et al. | ................. 386/125 |
| 6,574,416 B1 | * | 6/2003 | Posa et al. | .................... 386/69 |
| 6,870,573 B2 | * | 3/2005 | Yeo et al. | ................... 348/569 |

* cited by examiner

*Primary Examiner*—Huy Nguyen
(74) *Attorney, Agent, or Firm*—Staas & Halsey LLP

(57) ABSTRACT

A video recording and reproducing apparatus for simultaneously displaying a plurality of image contents recorded at given time points or images at a plurality of given portions within the same image contents is disclosed. A plurality of images read from a randomly accessible data storage unit for storing the images recorded by an image recording unit are synthesized into a single screen by an image synthesizer. An information processing unit reads from the image recording unit a plurality of image contents recorded at different time points or a group of images recorded at a plurality of different time points in a given one image content and causes the image synthesizer to display, by synthesizing the image contents or the images, as the case may be, on a single screen.

14 Claims, 15 Drawing Sheets

Fig. 4
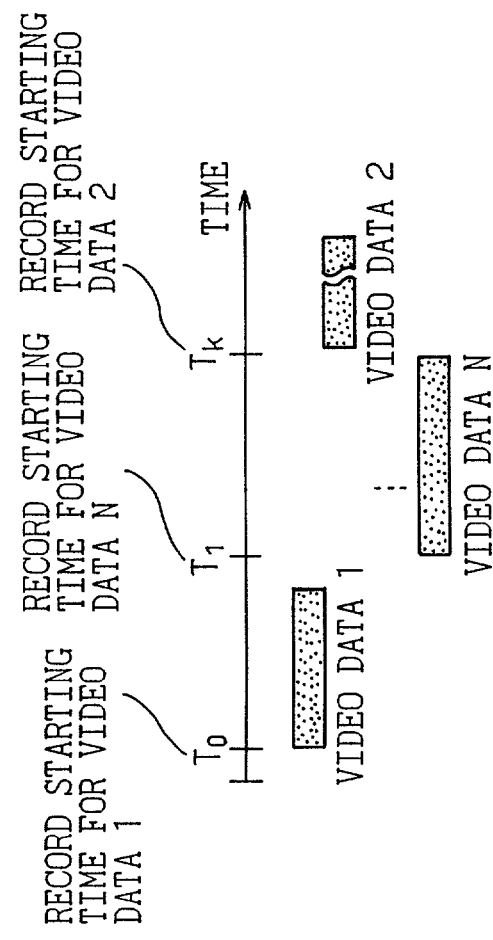
(a) CONVENTIONAL VIDEO DATA CAPABLE OF BEING SIMULTANEOUSLY REPRODUCED
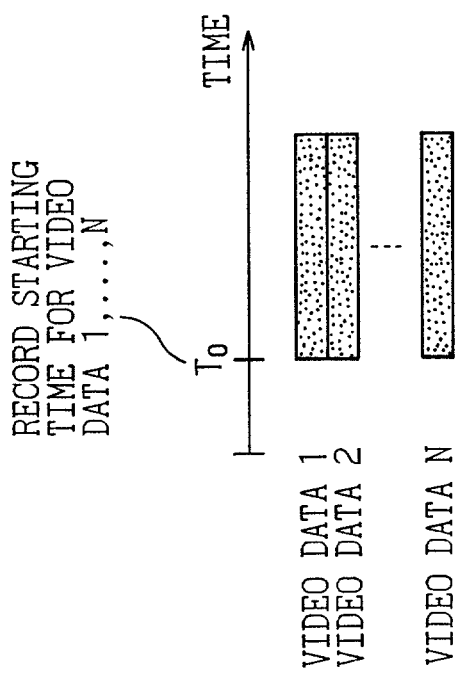
(b) VIDEO DATA CAPABLE OF BEING REPRODUCED AT THE SAME TIME ACCORDING TO THE INVENTION Fig. 5
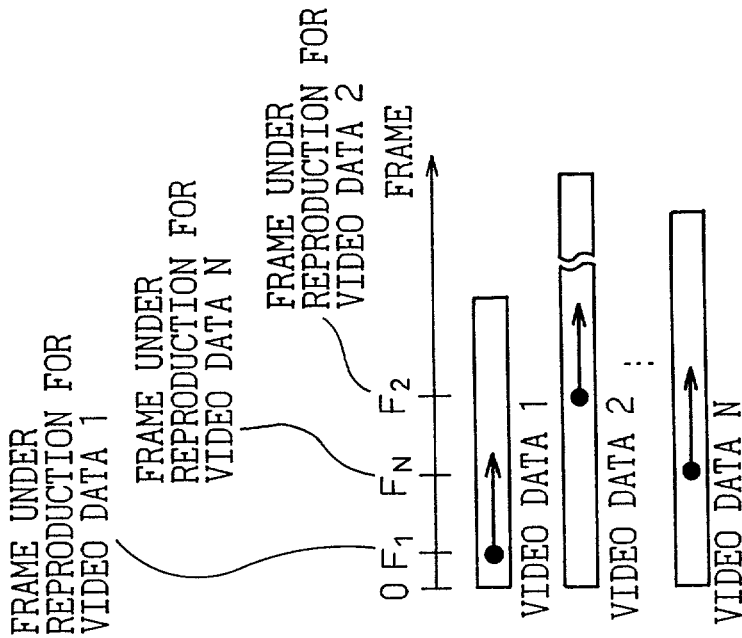
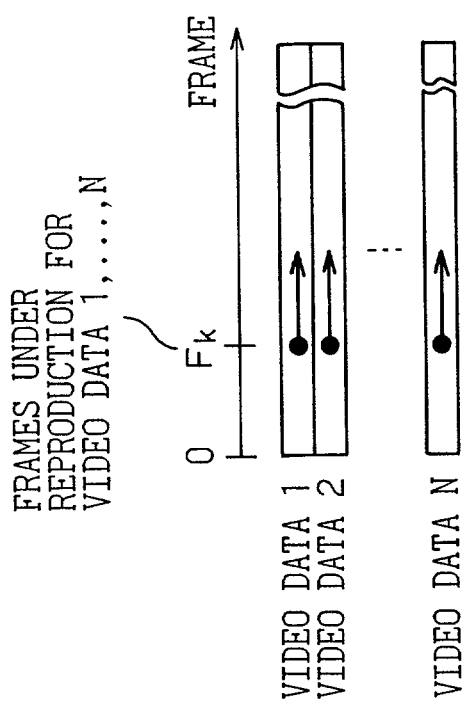

Fig.10

| ITEM | DESCRIPTION |
|---|---|
| NAME | CHARACTER STRING INFORMATION ATTACHED BY USER FOR IDENTIFYING IMAGE CONTENTS |
| RECORDING DATE/TIME | RECORD STARTING DATE/TIME, RECORD STARTING DATE/TIME AND RECORD ENDING DATE/TIME, OR RECORD STARTING DATE/TIME AND RECORDING TIME |
| IMAGE SOURCE | CHANNEL NUMBER SELECTED BY TUNER OR NUMBER INDICATING EXTERNAL INPUT |
| CATEGORY | SYMBOL OR NUMBER INDICATING OUTLINE OF IMAGE CONTENTS OF NEWS PROGRAM, MUSIC PROGRAM, DRAMA, EDUCATION PROGRAM, VARIETY SHOW, ETC. |
| POSITION INFORMATION | ADDRESS AND BLOCK SIZE STORED IN DATA STORAGE MEDIUM |
| KEY WORD | ARBITRARY CHARACTER STRING INFORMATION ATTACHED BY USER FOR PUTTING IMAGE CONTENTS INTO ORDER |
| ID NUMBER | NUMBER SPECIFIC TO IMAGE CONTENTS ATTACHED BY CENTRAL PROCESSING UNIT |

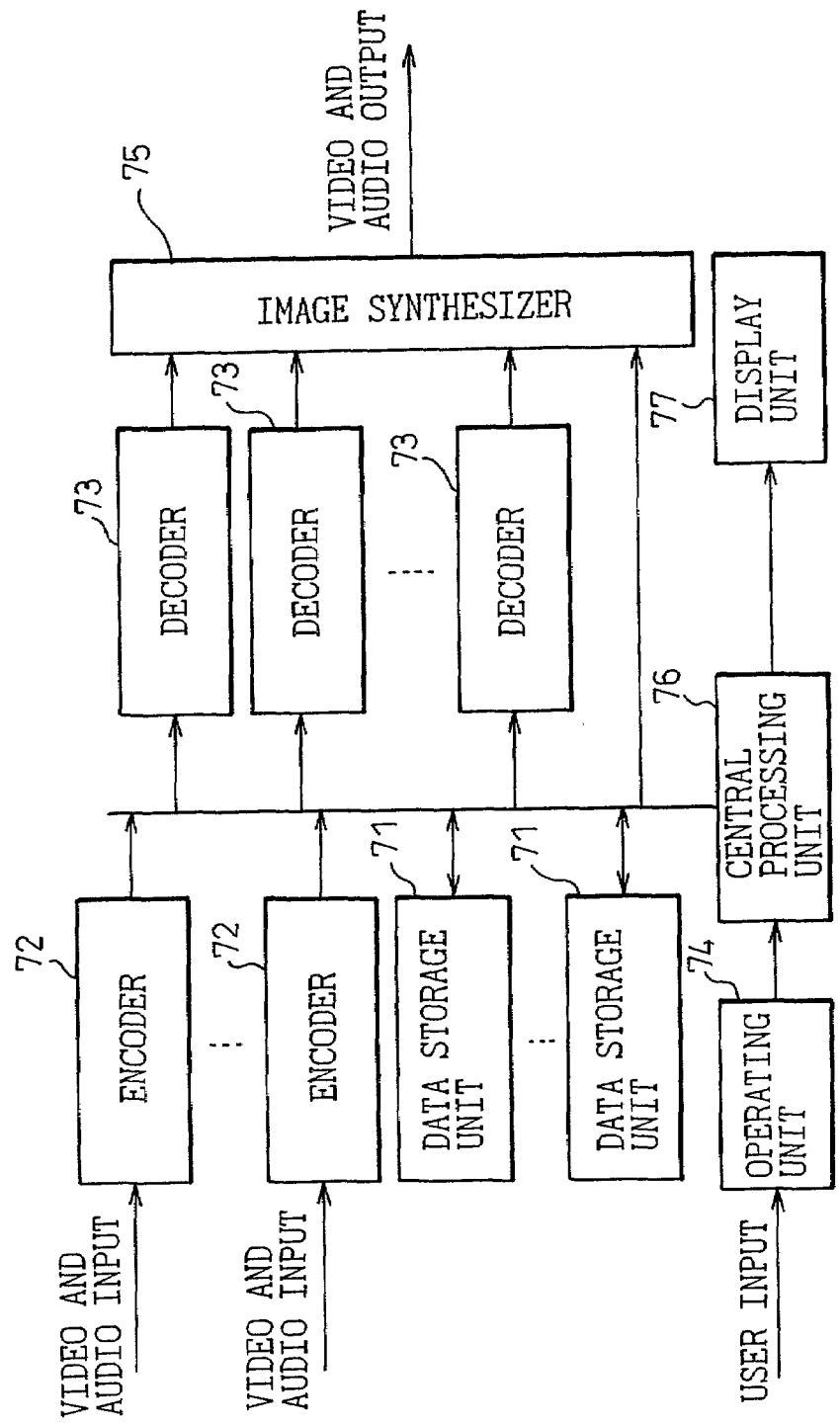

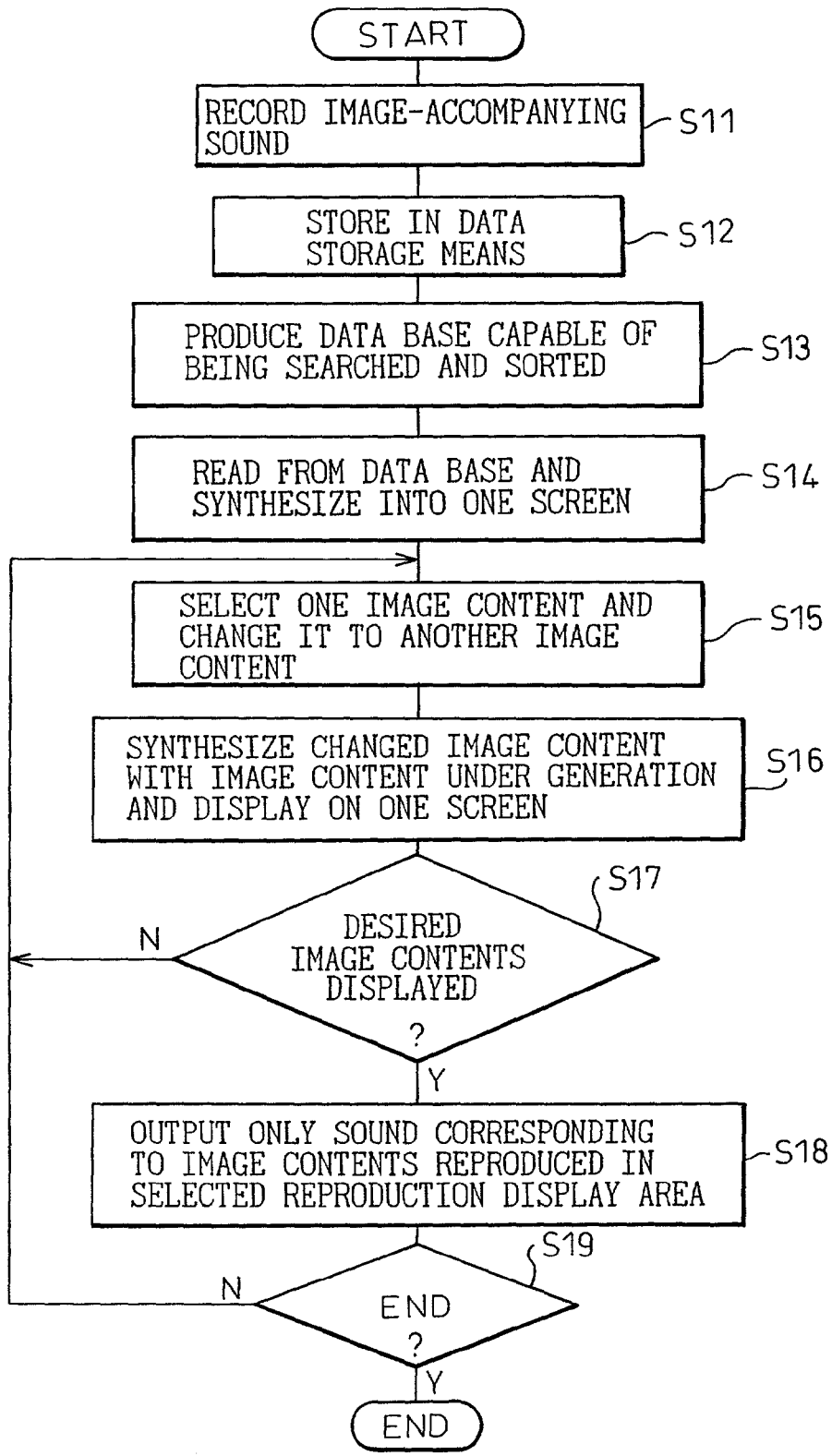

VIDEO RECORDING AND REPRODUCING APPARATUS

BACKGROUND OF THE INVENTION

1. Field of the Invention

The present invention relates to a video recording and reproducing apparatus for reproducing a plurality of arbitrary image contents or a plurality of arbitrary portions of the same image content at the same time and displaying a plurality of images on the same screen at the same time.

2. Description of the Related Art

In recent years, the data storage devices have increased in capacity and decreased in price and now find applications in various walks of life. As an example, with the extension of the use of a digital video (DV) camera and the start of the digital broadcasting, the data storage devices have begun to be used widely for recording images. Especially, a magnetic disk, an optical disk and a magneto-optic disk have superior characteristics for recording images due to their fast accessibility, low cost and large capacity.

A single video recording and reproducing apparatus having a data storage device of a larger capacity can store a multiplicity of image contents for a long time. By storing broadcast images for a long time over a plurality of channels and selecting the desired one of the image contents in store, for example, the desired image contents can be viewed without recording reservation.

Just as it is a very time-consuming job for the user to select and view the desired image contents or the desired scene included in the image contents from a multiplicity of video tapes, it requires a very long time for the user to select and view the desired image contents or the desired scene included in the image contents from the data storage medium. Even in the case where the image contents and the scenes are indexed, it is required of the user to inefficiently reproduce the images one by one and check the contents thereof. The image contents are defined herein as meaningful video data such as a broadcast program, and a scene is defined as a series of consistent cuts making up the image contents.

The conventional techniques for viewing a plurality of image contents are disclosed in Japanese Unexamined Patent Publication (Kokai) No. 02-070185 in which the contents of a plurality of channels are recorded in and reproduced from a magnetic tape at the same time, and Kokai No. 11-069302 in which images taken from a plurality of angles according to MPEG2 are displayed at the same time.

In any of the conventional techniques described above, however, only a plurality of images simultaneously recorded or a plurality of predetermined images can be viewed on the same screen at the time of reproduction, but it is impossible to search for the desired image contents or the desired scene in the image contents recorded at different time points. In view of this, it is important to realize a viewing function for efficiently searching for the image contents or the desired scene in the image contents recorded at different desired time points for each of a multiplicity of image contents or long-term image contents.

SUMMARY OF THE INVENTION

Accordingly, an object of the present invention is to provide a video recording and reproducing apparatus in which a plurality of image contents recorded at different time points or a plurality of portions of the same image contents recorded at different time points are reproduced at the same time and the resulting plural images are displayed on the same screen at the same time.

In order to achieve the object described above, according to one aspect of the invention, there is provided a video recording and reproducing apparatus comprising image synthesizing means for synthesizing into a single screen a plurality of images read from randomly accessible data storage means for storing the images recorded by image recording means, and information processing means for controlling the data storage means and the image synthesizing means, wherein the information processing means controls the data storage means and the image synthesizing means in such a manner that a plurality of images recorded by the image recording means at different time points are read from the data storage means and displayed on a single screen as an image synthesized by the image synthesizing means.

With the video recording and reproducing apparatus according to the first aspect of the invention described above, a plurality of images recorded at different time points can be synthesized and displayed on a single screen, and therefore the desired image can be found within a short time.

According to a second aspect of the invention, there is provided the video recording and reproducing apparatus according to the first aspect, in which a plurality of images recorded at different time points are either a plurality of image contents recorded at different time points or a plurality of images recorded at different time points in a given one of the image contents.

According to a third aspect of the invention, there is provided the video recording and reproducing apparatus according to the first aspect, further comprising user interface means interposed between the information processing means and the user, wherein special reproducing functions including rapid feed and/or pause are effected for the image contents arbitrarily selected through the user interface means.

Since the special reproducing functions such as rapid feed and pause of the image contents arbitrarily selected from a plurality of images is possible, the desired image can be efficiently searched for in a plurality of image contents, and the desired scene can be efficiently searched for in long-term image contents.

According to a fourth aspect of the invention, there is provided the video recording and reproducing apparatus according to the first aspect, further comprising user interface means interposed between the information processing means and the user, wherein a plurality of image contents recorded in the data storage means constitute a data base and can be searched and sorted, and wherein in accordance with the information input by the user interface means, at least one of the image contents searched for or sorted can be reproduced and synthesized and displayed on a single screen at the same time.

A plurality of image contents recorded in the data storage means make up a data base and can be searched and sorted, so that the image search efficiency can be improved further.

According to a fifth aspect of the invention, there is provided the video recording and reproducing apparatus according to the first aspect, further comprising user interface means interposed between the information processing means and the user, wherein the image contents selected through the user interface means are converted to another image contents and synthesized with the image contents being generated and on display on a single screen.

BRIEF DESCRIPTION OF THE DRAWINGS

FIG. 4 is a diagram for comparing and explaining the video data that can be reproduced at the same time according to the invention.

FIG. 5 is a diagram for explaining by comparison the fact that a plurality of arbitrary video data can be reproduced at the same time in a video recording and reproducing apparatus according to the invention.

FIG. 10 is a diagram for explaining the contents of a data base used for image search.

FIG. 15 is a diagram for explaining a third embodiment of the invention.

FIG. 16 is a flowchart for explaining a video recording and reproducing method according to an embodiment of the invention.

DESCRIPTION OF THE PREFERRED EMBODIMENTS

An embodiment of the invention will be described below with reference to the accompanying drawings.

Figure 1:
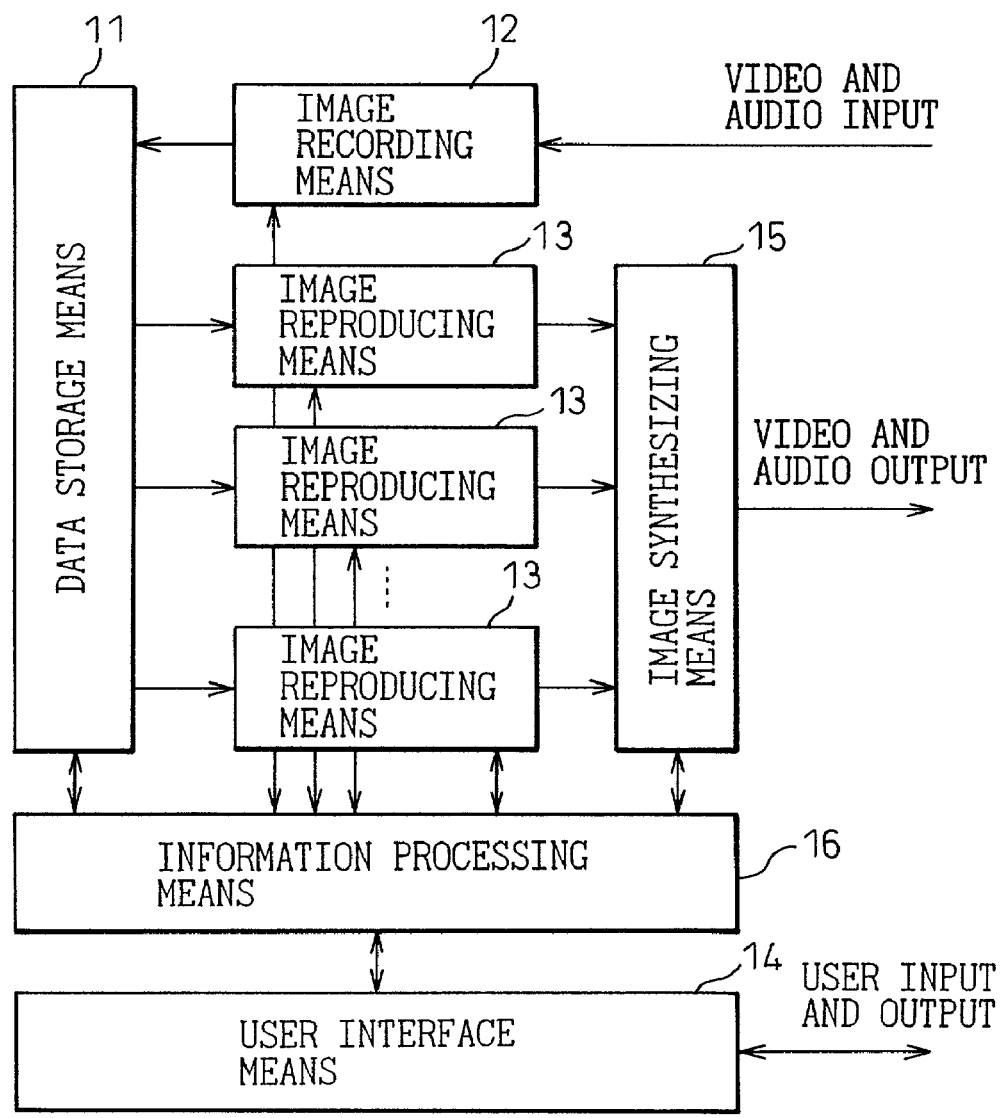
FIG. 1 is a block diagram showing a configuration of a video recording and reproducing apparatus embodying the present invention.

FIG. 1 is a block diagram showing a configuration of a video recording and reproducing apparatus embodying the invention.

In FIG. 1, the video recording and reproducing apparatus comprises, as in the prior art, data storage means 11, image recording means 12, a plurality of image reproducing means 13, user interface means 14, image synthesizing means 15 and information processing means 16.

The data storage means 11 is a semiconductor memory, a magnetic disk, an optical disk or the like random access memory and has the function of transferring data at a data transfer rate required for recording or reproducing at least one video data.

The image recording means 12 has the function of fetching and encoding the image-accompanying sound from a tuner or the like and transferring the image-accompanying sound data to the data storage means.

The image reproducing means 15 has the function of receiving and decoding the video data from the data storage means 11 and transferring the reproduced image to the image synthesizing means 15.

The user interface means 14 has the function of fetching a record or reproduce command into the apparatus through a button or the like mounted on a remote controller or the apparatus body and the function of displaying the command on a television monitor or a panel attached to the apparatus body.

The information processing means 16 has the function of adjusting the timing or rate of transferring the video data from the image recording means 12 to the data storage means 11 or from the data storage means 11 to the image reproducing means 15 and the function of transmitting information to each means in response to a command input by the user through the user interface means 14.

These means combine to perform both the recording and reproducing functions like a normal video recording and reproducing apparatus on the one hand and have the function of simultaneously reproducing and outputting by synthesizing a plurality of reproduced images at the same time.

Each of the functions starts the processing in response to a command received through the user interface means 14.

In recording mode, the image data obtained by fetching and encoding images from the tuner or the like in the image recording means 12 are stored in the data storage means 11 while at the same time controlling the transfer rate thereof by the image processing means 16.

In reproduction mode, on the other hand, each video data is read from the data storage means 11 while controlling the transfer rate thereof by the information processing means 12, and decoded and output as a reproduced image in the image reproducing means 13.

In simultaneous reproduction mode, as in reproduction mode, a plurality of video data are read from the data storage means 11 while controlling the transfer rate thereof by the information processing means 16, and the video data are decoded in each image reproducing means 13. A group of images reproduced in this way are synthesized and output in a single screen by the image synthesizing means.

Figure 2:
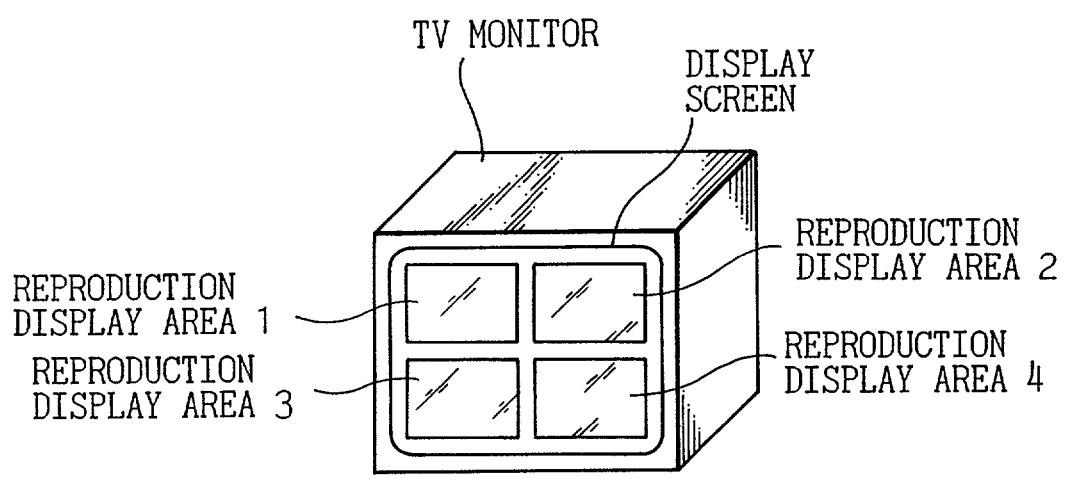
FIG. 2 is a diagram showing images displayed at the time of simultaneous reproduction in a video recording and reproducing apparatus according to the invention.

FIG. 2 is a diagram showing an example of the images displayed on the screen using four image reproducing means 13. In the case of FIG. 2, the images reproduced by the image reproducing means 13 are output to each of the areas into which the display screen of the TV monitor is segmented substantially into halves both horizontally and vertically. The arrangement on the display screen is not limited to that of FIG. 2, but the reproduced images may alternatively be arranged in one line either vertically or horizontally.

Figure 3:
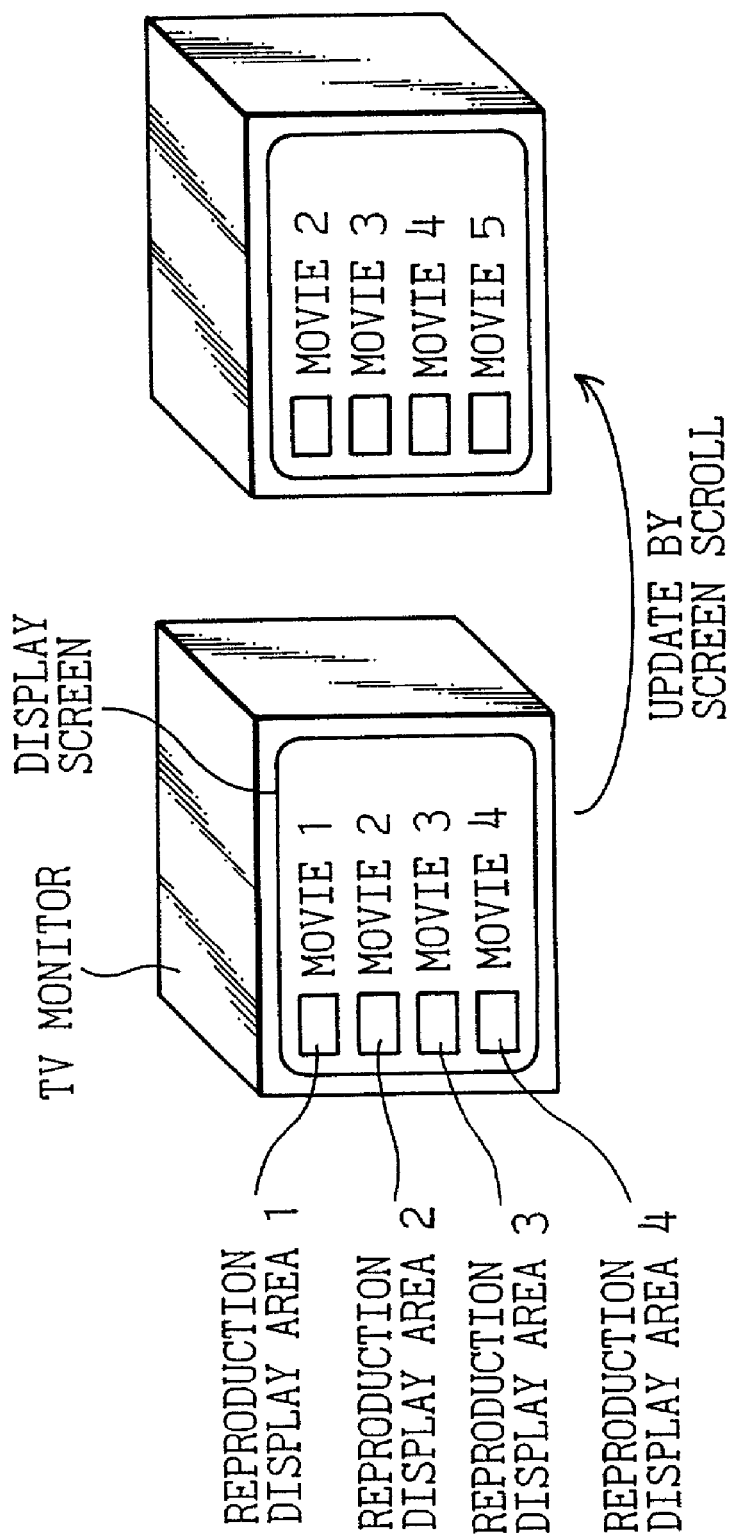
FIG. 3 is another diagram showing images displayed at the time of simultaneous reproduction in a video recording and reproducing apparatus according to the invention.

FIG. 3 is a diagram showing another example of the images displayed on the screen. In the images displayed on the screen shown in FIG. 3, the names attached to the images are plotted and displayed as a list in the space available in the screen. The reproduced image of each image content can be displayed immediately beside the list of stored image contents or a list of the search results, and therefore the image contents can be checked efficiently. In the case where the reproduced image is switched as the result of updating the screen by scrolling the screen with the list on display, for example, the contents can be checked more easily by simply scrolling the screen.

FIGS. 4a and 4b show a video data image that can be simultaneously reproduced in the prior art and a video data image that can be simultaneously reproduced according to the invention, respectively.

The video data that can be reproduced simultaneously in the conventional video recording and reproducing apparatus basically begin to be recorded at the same time in the manner shown in FIG. 4a or represent predetermined images like the stream for multi-angle display in conformance with MPEG2. According to this invention, in contrast, as shown in FIG. 4b, all the video data recorded at given time points can be handled. In other words, as many video data streams as there are decoders can be reproduced at the same time.

FIGS. 5a and 5b are diagrams showing a simultaneously reproduced image according to the prior art and a simultaneously reproduced image according to the invention, respectively.

In the conventional video recording and reproducing apparatus capable of simultaneous reproduction, as shown in FIG. 5a, only the frames recorded at the same time can be reproduced at the same time. In the multi-angle display stream according to MPEG2, only the data having the same time stamp attached thereto can be reproduced at the same time. In this way, only predetermined images can be reproduced at the same time, and the special reproducing functions such as rapid feed are performed for all the images reproduced at the same time. According to this invention, in contrast, as shown in FIG. 5b, the data in arbitrary frames of a plurality of image contents can be read out at the same time by randomly accessing the data storage unit, and each video data is input independently to each decoder. Therefore, the special reproducing functions are applicable to each video data independently.

Figure 6:
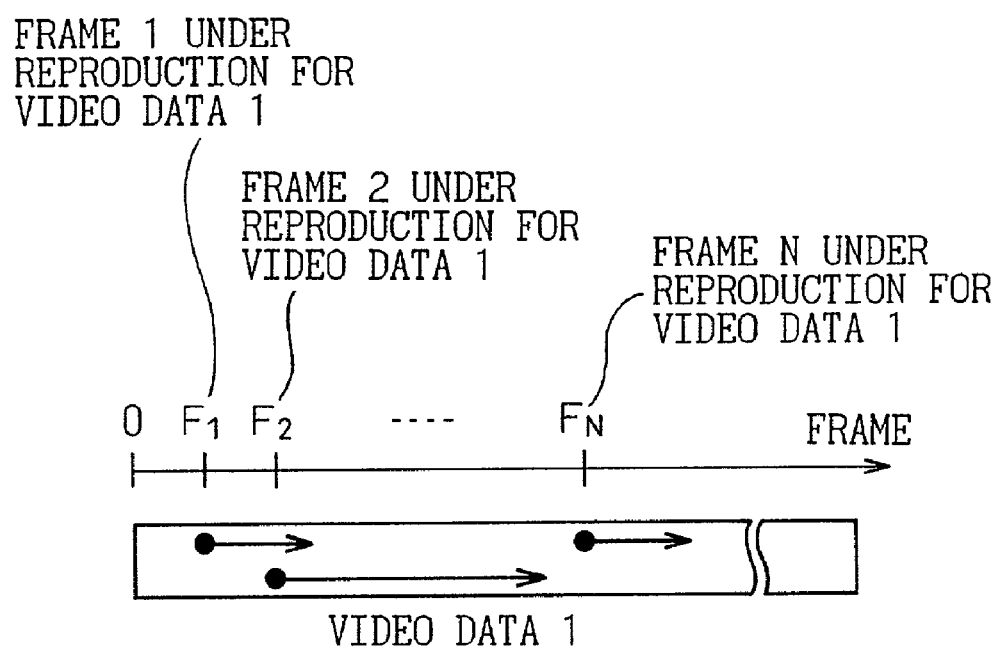
FIG. 6 is a diagram for explaining that a plurality of arbitrary portions of image contents can be reproduced at the same time in a video recording and reproducing apparatus according to the invention.

FIG. 6 is a diagram showing another example of a simultaneously reproduced image according to the invention. As shown in FIG. 6, data can be read at the same time from a plurality of the heads of given frames of the video data in the data storage unit.

The operating unit is constituted of buttons or the like mounted on the apparatus body, and a command is input from the user directly from this operating unit in the form of an electrical signal. As an alternative, a command can be input from the user by remote operation from a portable information terminal or a remote controller utilizing an infrared transceiver.

As described above, according to this invention, a group of images reproduced from a plurality of image contents recorded at a given time point or a group of images reproduced simultaneously from a plurality of arbitrarily selected portions of a single image content can be synthesized and displayed on a single screen. This function makes possible both the operation of efficiently searching for the desired one of a plurality of image contents and the operation of efficiently searching for the desired scene from long-term image contents.

Embodiment 1 Basic Function

Figure 7:
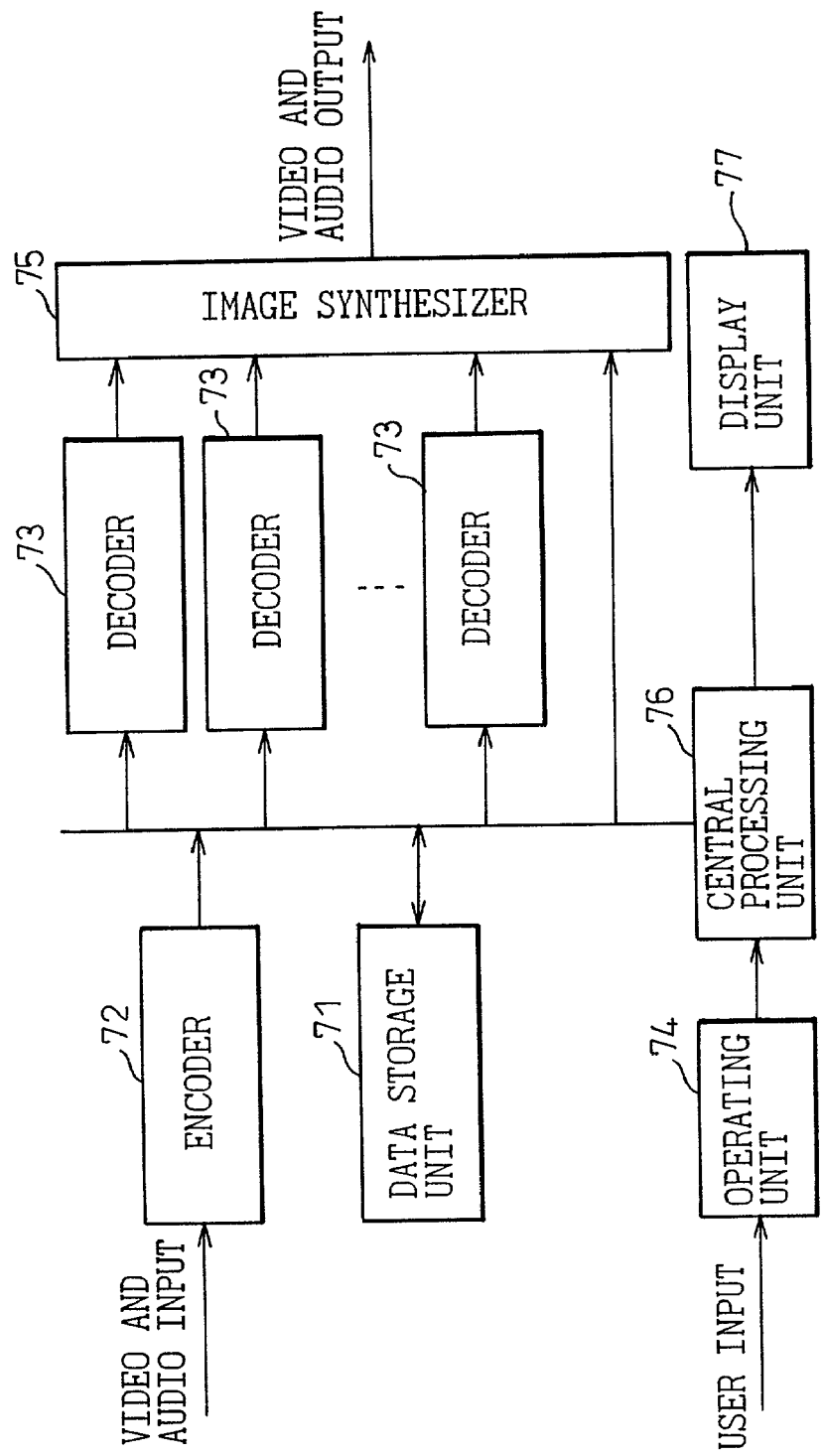
FIG. 7 is a block diagram showing a configuration of a video recording and reproducing apparatus according to a first embodiment of the invention.

FIG. 7 is a block diagram showing a video recording and reproducing apparatus according to a first embodiment of the invention. As shown in FIG. 7, the video recording and reproducing apparatus according to the first embodiment comprises a data storage unit 71, an encoder 72, a decoder 73, an operating unit 74, an image synthesizer 75, a central processing unit 76 and a display unit 77. According to this embodiment, a plurality of arbitrary image contents or a plurality of arbitrary portions of the same image content are reproduced at the same time and the resulting images are displayed on the same screen at the same time. The images and the image data can include the sound.

Recording Function

First, the recording function will be explained.

The recording function starts encoding the image and sound in the encoder 72 in response to a command input by the user from the operating unit 74. The image and sound may be input from either a tuner or an external source. The video data thus encoded are stored by being written into the data storage unit 71.

The video data recorded into the data storage unit 71 may be managed in the form of address and data length directly in the data storage unit 71. The use of a file system, however, facilitates data management.

By compressing the data amount using an interframe prediction encoding scheme such as ISO/IEC 13818 MPEG2 or ISO/IEC 11172 MPEG1 or an intraframe encoding scheme such as Motion-JPEG constituting a version of ISO/IEC 10918 JPEG applied to image sequences, the storage size of the data storage unit 71 can be reduced. In the case where a digital broadcast is received, on the other hand, the information encoded by MPEG-TS is obtained and therefore all that is required is to retrieve packets of the desired channel by the encoder.

Reproducing Function

Now, the reproducing function will be explained.

The reproducing function starts reading the video data from the data storage unit 71 in response to a command input thereto, by the user, from the operating unit 74. The video data is decoded and reproduced in the decoder 73. The image thus reproduced is output to the TV monitor or the like through the image synthesizer 75.

Also, the special reproducing functions such as rapid feed and pause can be carried out in response to a command input by the user.

In the process, a symbol or a text indicating that reproduction or a pause now is underway may be synthesized with the reproduced image and displayed on the screen.

Simultaneous Reproducing Function

The simultaneous reproducing function will be explained.

The simultaneous reproducing function, like the reproducing function, starts reading the video data from the data storage unit 71 in response to a command input by the user. The video data read out include a plurality of different video data or a plurality of portions of a single video data designated on temporal or other basis. The data storage unit 71 is a magnetic disk, an optical disk or the like device having a superior random access performance for reading a plurality of data substantially at the same time by time division or the like scheme. A plurality of video data thus read are each reproduced by being decoded in the decoder 73. The image group reproduced is synchronized and synthesized into a single screen in an image synthesizer 75. In the image synthesizer 75, the display size and the display position of the reproduced image are arbitrarily designated by the central processing unit 76. Also, the image synthesizer 75 synthesizes and displays characters, symbols and bit images together with the reproduced images. The display image as shown in FIG. 2 or 3 will be used.

Display Image Select Function

Figure 8:
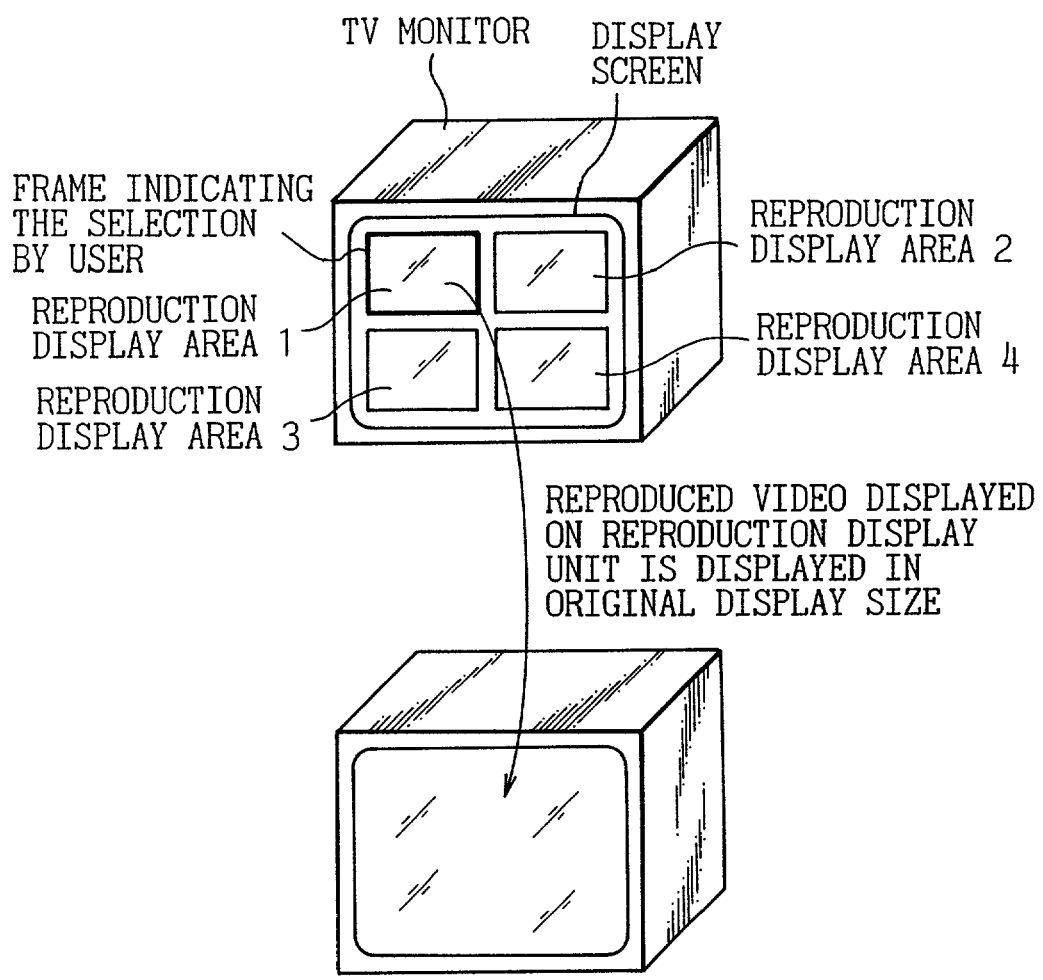
FIG. 8 is a diagram for explaining the functions of the user interface.

FIG. 8 is a diagram for explaining the display image select function for selecting one of the reproduced images and displaying it in the original size over the whole screen of the TV monitor.

In the image synthesizer, as shown in FIG. 8, only the reproduced image arbitrarily designated by the user through the operating unit 74 among the synthesized reproduced images is renewed into the original display size and displayed. The image synthesizer 75 constituting auxiliary operation means for the user to select a reproduced image functions as user interface means called GUI (Graphic User Interface) for synthesizing the frame surrounding the reproduction display unit with the reproduced image and displaying it as shown in FIG. 8.

The display size and position are determined appropriately by the central processing unit 76. The pattern for arranging the reproduction display areas may be either a matrix with the data arranged both horizontally and vertically, a column form with the data arranged vertically or a row form with the data arranged horizontally. Assuming that the number of encoders is K, the display of a pattern in a M×N matrix requires that K≦M×N. Specifically, assume that the image size of the video data is X0×Y0 and the size of each reproduction display area is X1×Y1. In the case where the data are displayed in a M×N matrix pattern, the display size and position are determined by the central processing unit 76 in such a manner that the size of each reproduction display area in horizontal direction meets the relation X1≦X0/M, and the size of each reproduction display area in vertical direction meets the relation Y1≦X0/N.

Image Search Function

Figure 9:
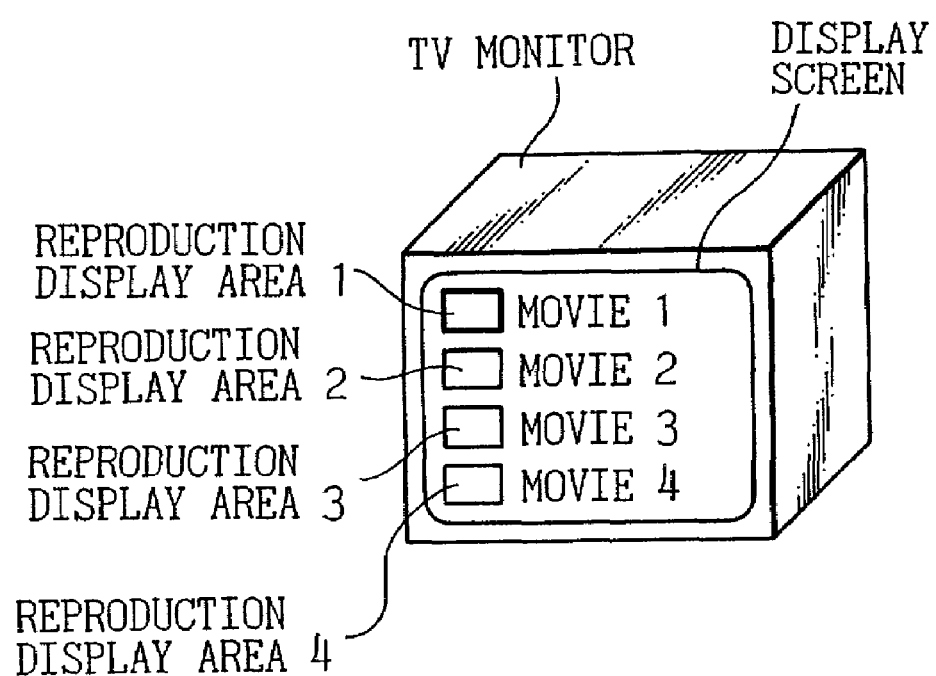
FIG. 9 is a diagram for explaining the operation of image search function.

A highly efficient image search function can be realized by utilizing the simultaneous reproduction of a plurality of different image contents and the special reproduction functions such as rapid feed. In the case where there are K decoders, the user can view K images at the same time when searching for the desired image. Therefore, the operating steps required for reproduction are reduced to about 1/K. Also, the desired scene can be searched for at the same time by effecting the special reproduction functions on the reproduced images selected arbitrarily by the user as shown in FIG. 9.

Figure 11:
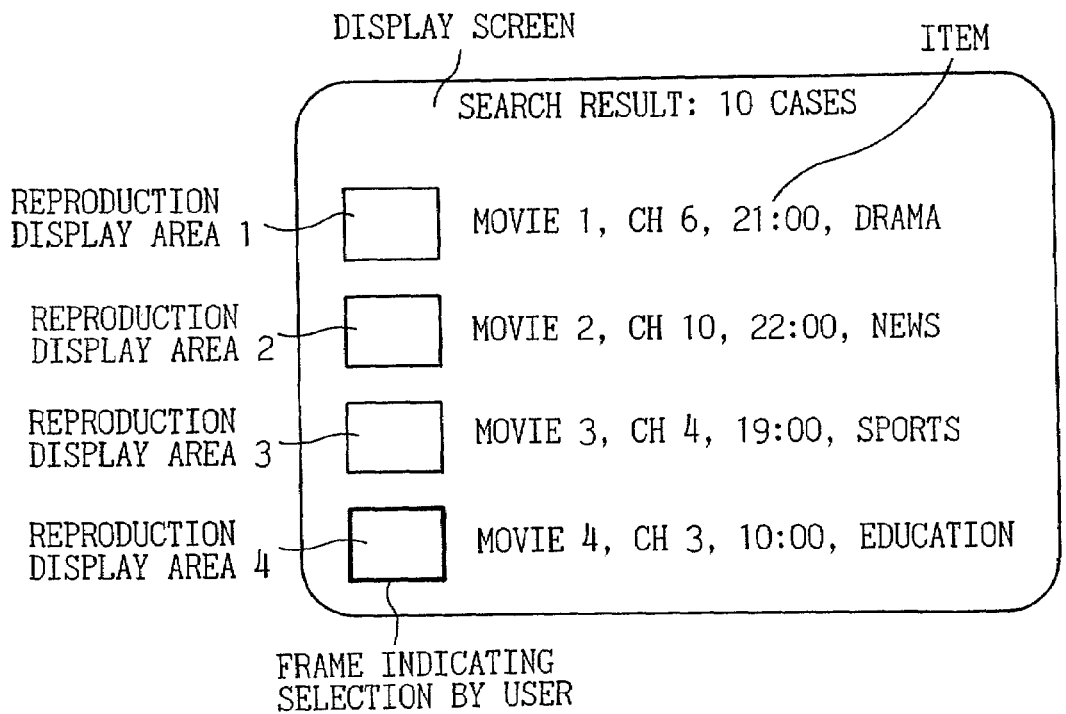
FIG. 11 is a diagram showing an example of displaying an image search result list using the simultaneous reproducing function.

In the process, the image search can be carried more efficiently by generating a data base in the central processing unit 76, in advance, for the image contents recorded in the data storage unit 71. The items to be registered in the data base include those shown in FIG. 10. The user can search for the desired image contents by using the items shown in FIG. 10. Based on the items input by the user, the central processing unit 76 produces a list of candidate items of the image contents from the data base. As a result, the reproduction display areas are arranged in a column, the image contents reproduced in the reproduction display areas are arranged in a column by the image synthesizer, and the items corresponding to the image contents arranged beside the reproduction display areas are presented to the user in the form of symbols or character strings. FIG. 11 shows an example of display image. In the case where a plurality of candidates are displayed in the search result list and the desired image contents cannot be determined simply by the items, the conventional apparatus operates in such a way that the user is required to check the contents by reproducing the data one by one, and before reproducing the desired image contents, it is necessary to repeat a plurality of times a series of operations of selecting, reproducing, subjecting to the special reproduction function the image contents, if required, and stopping the process. According to this invention, in contrast, the simultaneous reproducing function can be carried out automatically for the search result list, and therefore the number of steps of operation by the user is reduced for an improved search efficiency.

Figure 12:
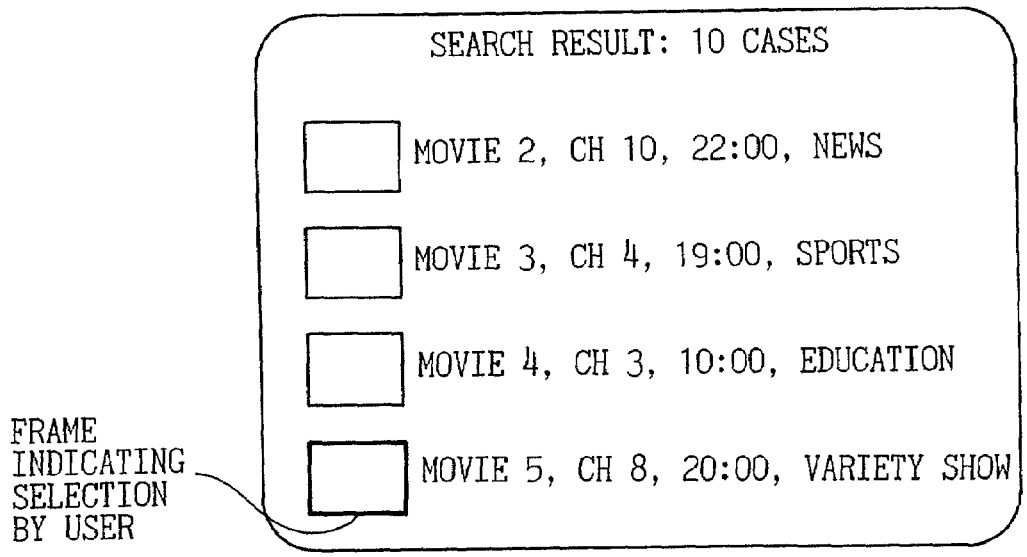
FIG. 12 is a diagram for explaining the procedure for updating the display of the image search result list.

Further, even in the case where the number of the candidates included in the search result list is greater than the number of the encoders 72, i.e. the number of the image contents capable of being displayed at the same time, the search operation can be performed efficiently by scrolling the screen and thus updating the candidates on display. In FIG. 12, the screen is scrolled when the user intends to select the next candidate. The steps for scroll display will be explained with reference to the case where the number of the decoders is 4. First, the reproduction of the image contents displayed in the reproduction display area 1 is stopped. Then, the area with which a decoder has thus far been associated for display is changed from the reproduction display area 2 to the reproduction display area 1, followed by changing the display position of the related items. Similarly, the reproduction display area 2 and the reproduction display area 3 are changed. The decoder used first for display in the reproduction display area 1 reproduces the image contents to be newly displayed, displays it in the reproduction display area 4 together with the items. A similar process is performed in the case where the user intends to select the next candidate. This sequence of steps updates the whole display screen and realizes the scroll display as shown in FIG. 12. Conversely, in the case where a preceding candidate is to be selected, the decoding operation for the reproduction display area 4 is stopped, and the display area for the decoder thus far associated with for display is changed from the reproduction display area 3 to the reproduction display area 4. In similar fashion, the reproduction display area 1 and the reproduction display area 2 are changed. Then, the image contents for the preceding candidate are reproduced by the decoder involved first in the display in the reproduction display area 4 and displayed in the reproduction display area 1.

A list of all the image contents, if prepared in addition to the search result list, may be displayed in similar fashion.

Scene Search Function

Figure 13:
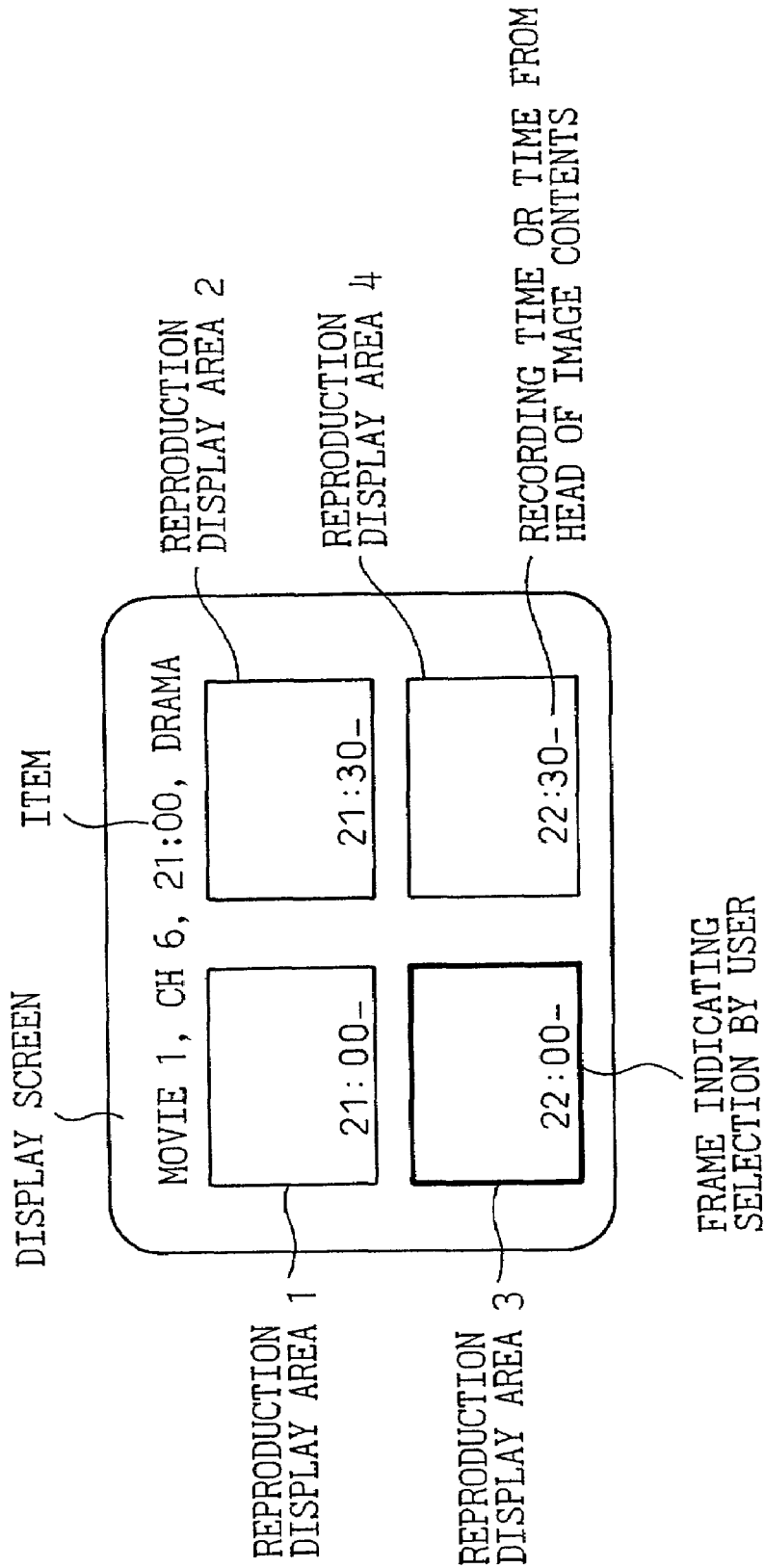
FIG. 13 is a diagram for explaining the operation of the scene search function.

A highly efficient scene search can be realized by utilizing the simultaneous reproduction of a plurality of arbitrary portions of the same image contents and the special functions such as rapid feed. An example will be explained with reference to FIG. 13 showing the case involving four decoders. The upper left part indicates that the reproduction is started from the head of the image contents, while the upper right part indicates that the reproduction is started from the point corresponding to 30 minutes from the head of the image contents. The time information plotted for each reproduction display area may be based on the record starting time. A more efficient scene search is made possible especially by using the rapid feed reproduction among the special reproducing functions. The special reproduction makes possible the operation for all the reproduction display areas selected by the user thereby to further reduce the user operation. The image contents are selected by the user on the display screen of a list of image contents or the display screen of a list of search results.

Transfer Control

The transfer of the image data required for the simultaneous reproduction or the simultaneous special reproduction is liable to be limited by the transfer rate of the data storage function or the transfer rate of the data bus. In view of this, the video data of the reproduction display area selected by the user are transferred at top priority. In this way, the individual image data transfer rates are regulated in such a manner as not to delay the reproduction and the special reproduction of at least one reproduction display area. Specifically, as for the image contents low in priority order not selected by the user, all the data are not read from the data storage unit 71 but the data are transferred intermittently by skipping the addresses in order not to cause any reproduction delay. By this transfer control, a plurality of image data simultaneously reproduced can be smoothly displayed within the range limited by the transfer rate of the data storage function and the transfer rate of the data bus. As for the video data encoded by the intraframe coding scheme or the video data not compressed, the data are skipped by frame. In the case where data of every other frame are transferred, for example, the data transfer rate can be halved although the frame rate is also reduced to one half. As for the video data encoded by the interframe prediction encoding scheme, on the other hand, the data are skipped by a unit specific to the particular encoding scheme. In the case of ISO 11171 MPEG1, for example, a plurality of frames called GOP (Group of Pictures) are encoded at a time, and therefore the data are skipped by GOP. Normally, a predetermined number of frames are contained in GOP. In the case where data are transferred by being skipped by GOP, therefore, the data transfer rate is reduced to one half.

Embodiment 2 Sound Processing Method

The image processing method for the simultaneous reproduction function was described above. Now, a sound processing method will be explained. In the case where a plurality of image contents are reproduced at the same time, the user can retrieve only the useful information from the image by moving the point of viewing the screen. In the case where the sound of all the image contents reproduced at the same time are synthesized at the same level, on the other hand, the individual sounds are very difficult to aurally identify. This is similar to the fact that the voices of a plurality of persons speaking at the same time cannot be aurally identified easily. Therefore, it is necessary to output only the sound in the reproduction display area designated by the user.

Figure 14:
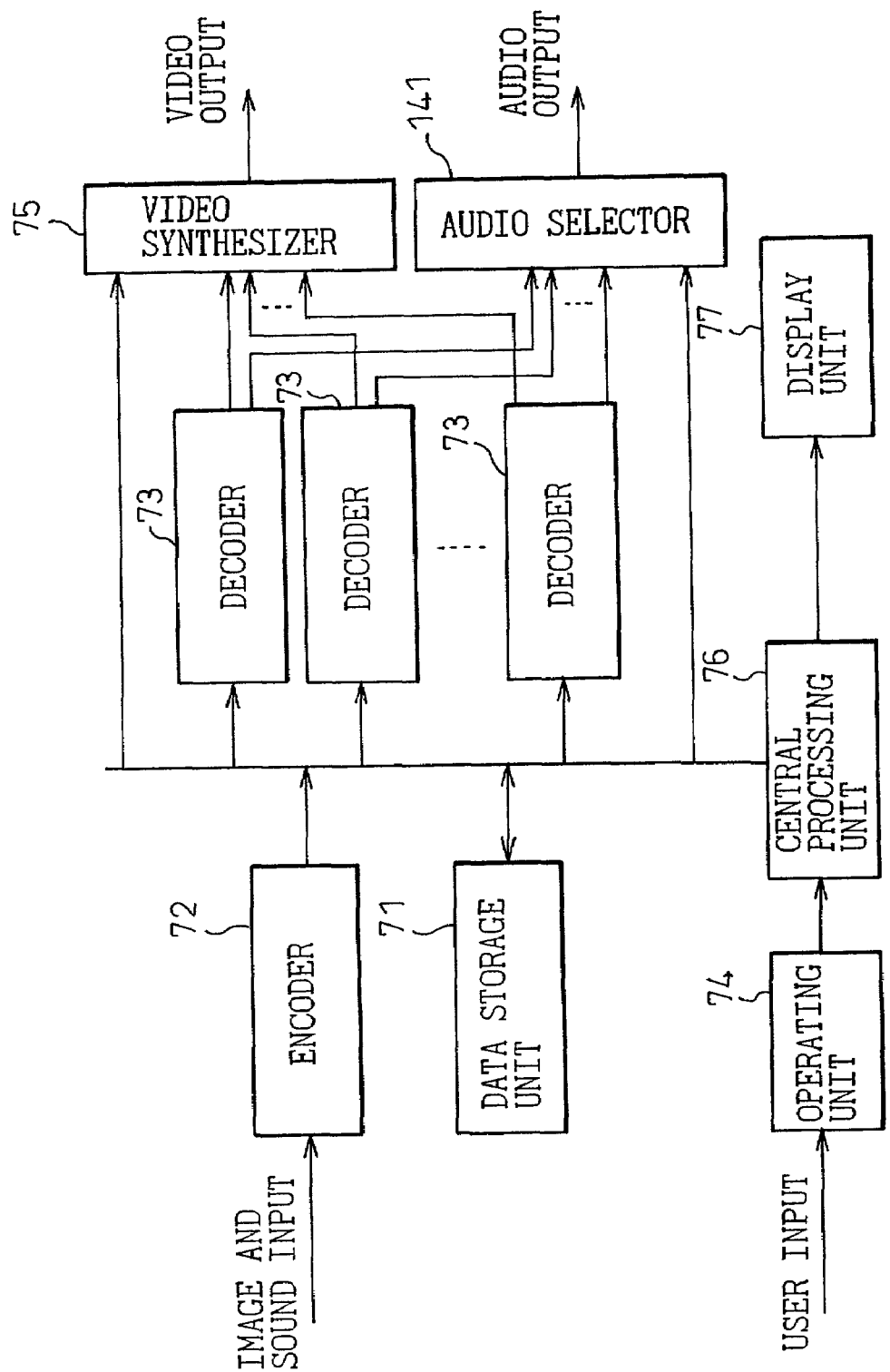
FIG. 14 is a diagram for explaining a second embodiment of the invention.

FIG. 14 shows a second embodiment of the invention representing an example of a configuration of a video recording and reproducing apparatus with an improved audio output of the video data reproduced at the same time. In FIG. 14, the same component parts as the corresponding ones in FIG. 7 are designated by the same reference numerals, respectively. As shown in FIG. 14, a sound selector 141 is added separately from the image synthesizer 75. Thus, only the audio output of the image contents reproduced in the reproduction display area selected by the user is produced through the sound selector 141.

Embodiment 3 other Apparatus Configurations

FIG. 15 shows a third embodiment of the invention, and represents an example of a configuration of a video recording and reproducing apparatus comprising a plurality of encoders for simultaneous multi-channel recording. As shown in FIG. 15, simultaneous multi-channel recording is performed by the provision of a plurality of encoders 72. This embodiment is different from the conventional simultaneous recording and reproducing method in that the recording can be performed for each channel independently taking advantage of the fact that the data storage unit 71 is randomly accessible. Further, the provision of a plurality of the data storage units 71 makes it possible to alleviate the limitation of the data transfer rate to the reproduction transfer rate of the data storage unit 71 at the time of simultaneous recording or simultaneous reproduction. In the case where the recording and reproducing operations are performed at the same time, the data transfer control is required to give top priority to the data transfer from the encoders 72 to the data storage units 71. Specifically, in the case where the recording and reproducing operations are performed at the same time while the data transfer rate required for each image data transfer is limited to the data transfer rate of the data storage unit 71 or the data bus, the data are obtained from the data storage unit 71 intermittently as described above in such a manner as to secure the recorded video data at least free of drop-offs.

Software

The functions of the video recording and reproducing apparatus described above can be realized with a program on most common personal computers. Specifically, apart from a personal computer having a random access data recorder, an image encoder, an image decoder and an image synthesizer, the configuration of a personal computer can be replaced with software by employing an image encoding module instead of an image encoder and an image decoding module instead of an image decoder.

FIG. 16 is a flowchart for explaining a video recording and reproducing method implemented by a program according to an embodiment of the invention. In FIG. 16, the image-accompanying sound is recorded by image recording means 12 in step S11, and the recorded image-accompanying sound is stored in data storage means 11 in step S12. The data thus stored are converted into a data base in step S13 to permit search and sorting. Then, a plurality of image contents recorded at different time points or a plurality of images recorded at different time points in a single image content are read out and synthesized into a single screen by image synthesizing means 15 in step S14. In the next step S15, one image content or one image is selected from the display screen through user interface means 14 and moved on the screen by scrolling or the like thereby to display other image contents or other images. Then, in step S16, the image contents or the images thus changed are synthesized with the image contents or images under generation and displayed on a single screen.

The user determines whether the image contents or the images on display are the desired ones or not. Unless they are the desired ones, the process returns to step S15 to continue the search. In the case where the desired screen is displayed, on the other hand, one of a plurality of the reproduction display areas where a plurality of image contents or images are displayed is selected thereby to output only the sound corresponding to the image contents or the images reproduced in the selected reproduction display area. As a result, the user can hear only the sound corresponding to the desired image. The user then determines in step S19 whether the search of the image contents or images is to be terminated, and if not terminated, the process of steps S15 to S17 is repeated.

The process explained above with reference to FIG. 16 can be realized by activating the information processing means 16 shown in FIG. 1 or the central processing unit 76 shown in FIG. 17 by a program.

According to this invention, there is also provided a recording medium for storing the program to realize the method described above with reference to FIG. 16. The recording medium includes computer readable storage such as a CD-ROM, a floppy disk or the like.

As described above, according to this invention, a plurality of arbitrary image contents can be reproduced at the same time and displayed at the same time on the same screen, and a plurality of arbitrary portions of the same image content can be reproduced at the same time and displayed at the same time on the same screen. Also, using the aforementioned effects, the number of operations by the user for searching for the desired image contents can be reduced by displaying while reproducing a list of the image content search functions or a list of all the image contents on the same screen. Further, the number of operations by the user for searching for the desired scene can be reduced by reproducing a plurality of portions of the image contents at the same time, thereby greatly contributing to an improved performance of the video recording and reproducing apparatus.

The invention claimed is:

1. A video recording and reproducing apparatus, comprising:
   image recording means for recording on a medium, at different time points, a plurality of moving picture image contents and image data including sound data from a video input;
   randomly accessible data storage means for storing the plurality of moving picture image contents and image data including sound data recorded in said image recording means;
   image displaying means for displaying at the same time in one screen a plurality of the moving picture image contents recorded at the different time points and read out from said data storage means;
   sound select means for selecting a sound designated by a user to be output;
   information processing means for controlling said data storage means, said image displaying means, and said sound selecting means in such a manner that a plurality of moving picture image contents recorded in said image recording means at different time points are read from said data storage means and displayed in a single screen by said image displaying means and the sound designated by the user is reproduced; and
   user interface means, interposed between said information processing means and the user, performing special reproduction functions, including at least a selected one of rapid feed and pause, on the moving picture image contents selected arbitrarily by the user through the user interface means.

2. A video recording and reproducing apparatus according to claim 1, wherein the plurality of moving picture image contents stored in said data storage means are converted into a data base capable of being searched and sorted, and at least one of the moving picture image contents included in a group of moving picture image contents searched for and sorted from said data base is displayed in a single screen in accordance with information input from said user interface means.

3. A video recording and reproducing apparatus according to claim 1, wherein the moving picture image contents selected through said user interface means are changed to other moving picture image contents and the resulting image contents are displayed in a single screen with the moving picture image contents under generation.

4. A video recording and reproducing method, comprising:
   recording on a medium, at different time points, a plurality of moving picture image contents and image data including sound data from a video input by an image recording means;
   storing the plurality of moving picture image contents and image data including sound data from a video input by the image recording means in a randomly accessible data storage;
   displaying, at the same time in one screen, the plurality of the moving picture image contents recorded at the different time points and read out from said data storage;
   selecting a sound designated by a user to be output;
   controlling said data storage, said displaying, and said selecting in such a manner that a plurality of moving picture image contents recorded at different time points are read from said date storage and displayed in a single screen and the sound designated by the user is reproduced; and
   performing special reproduction functions, including at least a selected function of rapid feed and pause, on moving picture image contents selected arbitrarily by the user.

5. A video recording and reproducing method according to claim 4, wherein the plurality of said images, recorded at different time points, comprise a plurality of moving picture image contents recorded at different time points or a plurality of images, in a given said image content, recorded at different time points.

6. A video recording and reproducing method according to claim 4, further comprising converting a plurality of the moving picture image contents, stored in said data storage, into a data base capable of being searched and sorted, and displaying at least one of the moving picture image contents, included in a group of moving picture image contents searched for and sorted from said data base in a single screen in accordance with information input from said user.

7. A video recording and reproducing method according to claim 4, wherein the moving picture image contents selected by said user are changed to other, resulting moving picture image contents and the resulting moving picture image contents are displayed in a single screen.

8. A recording medium for storing a program readable by an information processing unit, to control the information processing unit to:
   record on a medium, at different time points, a plurality of moving picture image contents and image data including sound data from a video input;
   store the plurality of moving picture image contents and image data including sound data from a video input in a randomly accessible data storage;
   display, at the same time in one screen, the plurality of the moving picture image contents recorded at the different time points and read out from said data storage;
   select a sound designated by a user to be output;

control said data storage, said image displaying, and said sound selecting in such a manner that a plurality of moving picture image contents recorded at different time points are read from said date storage and displayed in a single screen and the sound designated by the user is reproduced; and perform special reproduction functions, including at least a selected function of rapid feed and pause, on moving picture image contents selected arbitrarily by the user.

9. A recording medium according to claim 8, wherein the program further controls the processing unit to:

convert a plurality of the moving picture image contents stored in said data storage into a data base capable of being searched and sorted, and display at least one of the moving picture image contents, included in a group of moving picture image contents searched for and sorted from said data base in a single screen in accordance with information input by said user.

10. A recording medium according to claim 8, wherein the program further controls the processing unit to:

change the moving picture image contents, selected by said user, to other moving picture image contents and display the resulting other moving picture image contents in a single screen.

11. A video recording and reproducing apparatus, comprising:

an image recorder recording on a medium, at different time points, a plurality of moving picture image contents and image data including sound data from a video input;

a randomly accessible data storage storing the plurality of moving picture image contents and image data including sound data recorded in said image recorder;

an image display displaying at the same time in one screen a plurality of the moving picture image contents recorded at the different time points and read out from said data storage;

a selector selecting a sound designated by a user to be output;

an information processor controlling said data storage, said image display, and said selector in such a manner that a plurality of moving picture image contents recorded in said image recorder at different time points are read from said data storage and displayed in a single screen by said image display and the sound designated by the user is reproduced; and a user interface, interposed between said information processor and the user, performing special reproduction functions, including at least a selected one of rapid feed and pause, on the moving picture image contents selected arbitrarily by the user through the user interface means.

12. A video recording and reproducing apparatus according to claim 11, further comprising a user interface interposed between said information processor and the user, wherein a plurality of moving picture image contents stored in said data storage are converted into a data base capable of being searched and sorted, and at least one of the moving picture image contents, included in a group of moving picture image contents searched for and sorted from said data base and reproduced at the same time is displayed in a single screen in accordance with the information input from said user interface.

13. A video recording and reproducing apparatus according to claim 11, further comprising a user interface interposed between said information processor and the user, wherein the moving picture image contents selected through said user interface are changed to other moving picture image contents and the resulting, other moving picture image contents are displayed in a single screen with the moving picture image contents under generation.

14. A video recording and reproducing method, comprising:

recording on a medium, at different time points, a plurality of moving picture image contents and image data including sound data from a video input;

storing the plurality of moving picture image contents and image data including sound data from a video input in a randomly accessible data storage;

displaying, at the same time in one screen, the plurality of the moving picture image contents recorded at the different time points and read out from said data storage;

selecting a sound designated by a user to be output; and controlling said data storage, said displaying, and said selecting in such a manner that a plurality of moving picture image contents recorded at different time points are read and displayed in a single screen and the sound designated by the user is reproduced.

* * * * *

UNITED STATES PATENT AND TRADEMARK OFFICE
CERTIFICATE OF CORRECTION

| | |
|---|---|
| PATENT NO. | : 7,362,955 B2 |
| APPLICATION NO. | : 09/816370 |
| DATED | : April 22, 2008 |
| INVENTOR(S) | : Yukihiro Abiko et al. |

It is certified that error appears in the above-identified patent and that said Letters Patent is hereby corrected as shown below:

Column 12, Line 28, change "date" to --data--.

Column 13, Line 4, change "date" to --data--.

Signed and Sealed this

Twelfth Day of August, 2008

JON W. DUDAS
*Director of the United States Patent and Trademark Office*